TELEVISION CAMERA CIRCUIT FOR DEVELOPING HORIZONTAL AND VERTICAL SYNC PULSES AND BLANKING PULSES FROM THE SWEEP CIRCUITS

Filed June 28, 1965

STANLEY E. LEHNERT
INVENTOR
BY Anderson, Luedeka, Fitch, Even & Tabin
ATTORNEYS

STANLEY E. LEHNERT
INVENTOR
BY Anderson, Luedeka, Fitch, Even & Tabin
ATTORNEYS

TELEVISION CAMERA CIRCUIT FOR DEVELOPING HORIZONTAL AND VERTICAL SYNC PULSES AND BLANKING PULSES FROM THE SWEEP CIRCUITS

Filed June 28, 1965

STANLEY E. LEHNERT
INVENTOR

BY Anderson, Luedeka, Fitch, Even & Tabin
ATTORNEYS

Inventor
STANLEY E. LEHNERT
BY Anderson, Luedeka, Fitch, Even & Tabin
ATTYS

Inventor
STANLEY E LEHNERT
BY
Anderson, Luedeka, Fitch, Even & Tabin
ATTYS.

United States Patent Office 3,408,459
Patented Oct. 29, 1968

3,408,459

TELEVISION CAMERA CIRCUIT FOR DEVELOPING HORIZONTAL AND VERTICAL SYNC PULSES AND BLANKING PULSES FROM THE SWEEP CIRCUITS

Stanley E. Lehnert, Addison, Ill., assignor to Ampex Corporation, Redwood City, Calif., a corporation of California Filed June 28, 1965, Ser. No. 467,784
8 Claims. (Cl. 178—69.5)

The present invention relates to television camera circuits and more particularly to circuits for generating blanking and synchronizing signals and combining such signals into a composite picture signal, most particularly for closed-circuit television cameras.

In television cameras horizontal and vertical deflection circuits are employed to provide the scanning of an electron beam, which sequentially reads out an electrically stored optical image. Conventional design normally includes scanning frequency oscillators which in turn drive output deflection amplifiers. The output deflection amplifiers produce the required power level to drive either a deflection yoke or deflection plates to deflect an electron beam within the camera tube. In this manner, the electron beam is made to scan the electrically converted optical image both horizontally and vertically in a linear manner. The basic scanning cycle can be conveniently divided into two parts: (1) the active, and (2) the inactive video portions. During the active scan portion of the cycle, the video portion of the camera output is generated. During the inactive portion of the scan, the camera tube is cut off (blanked) and the beam is repositioned for the start of the next active scan interval. Blanking of the camera tube must also be accompanied by blanking of the monitoring device in order to prevent retrace lines from appearing in the reproduced picture. The blanking pulse is therefore preserved and becomes an essential part of the composite picture signal output of the television camera. In addition to picture and blanking components of the composite picture signal, a third signal component, the synchronizing pulses, are provided to maintain proper timing of the deflection circuits in the monitoring device.

In the television broadcast field, definite standards have been defined in respect to the synchronizing and blanking components of the composite picture signal. Fixing of these standards has resulted in system compatibility for all of the various television monitors and receivers available.

The present invention relates to circuits for producing horizontal and vertical synchronizing and blanking components, and introducing them into the picture signal to produce a composite picture signal. The present invention is particularly directed to closed-circuit television wherein the blanking and synchronizing components may differ somewhat from broadcast standards while remaining compatible with the conventional television monitors and receivers. Such deviation from broadcast standards permits a novel arrangement of components with the elimination of many circuits and components otherwise required without adversely affecting the quality of the resultant picture. This is particularly desirable for television cameras to be used in closed-circuit television for the home, industry and education where small size and low cost is demanded.

The present invention utilizes a number of components and circuits already required for other purposes for the additional purpose of developing the blanking and synchronizing pulses, and reduces the number of components and circuits required solely for the blanking and synchronization. In accordance with the present invention, the horizontal and vertical blanking and synchronizing pulses are developed from pulses necessarily produced in horizontal and vertical deflection circuits in the course of developing signals for driving the horizontal and vertical deflection coils of the camera.

In the case of the horizontal blanking and synchronizing pulses, these pulses are developed from pulses having finite rise and fall times, and may be half cycles of sine waves. The horizontal deflection circuit necessarily includes a circuit for developing pulses at the rate required for horizontal deflection of the electron beam in the television camera. Such pulses are utilized to drive the horizontal deflection coils, to cause the electron beam to deflect horizontally at the required rate and frequency.

As noted earlier, it is desired to blank the television camera during the horizontal and vertical retracing of the electron beam. Thus, the blanking pulses must be in synchronism with the retracing and hence in synchronism with the signals driving the deflection coils. The horizontal blanking pulses may therefore be obtained from the circuit developing the signals for driving the horizontal deflection coil and producing the horizontal retrace of the electron beam. This horizontal retrace may be produced by pulses having finite rise and fall times; that is, where there is a finite slope to the rise and fall of the pulses. In accordance with the present invention, the horizontal blanking pulses are derived from the bases of these pulses used for causing the electron beam retrace. There is a certain time interval between the time when each pulse begins to rise until it returns to its base level. This time interval is time-related to the retracing of the electron beam. Pursuant to the present invention a horizontal blanking pulse is developed from the horizontal deflection circuit to turn off the electron beam for the duration of the blanking pulse, thereby blanking the electron beam while it is retracing. This same blanking pulse is applied to the amplified output signal of the camera tube at a later stage, thereby placing definite blanking intervals in the composite picture signal.

Horizontal synchronizing pulses are desired during the horizontal blanking intervals. These pulses should ride on the blanking pulses leaving so-called front and back porches; that is, leaving portions of the blanking pulses on either side of the synchronizing pulses.

The horizontal synchronizing pulses are also developed from the pulses producing the horizontal retrace. In this case, the horizontal deflection pulses are clipped a substantial distance from their base. Because of the slopes to the rise and fall of the pulses, the duration of each of the clipped pulses is substantially shorter than the duration of the respective deflection pulse. Further, each clipped pulse occurs intermediate the ends of a corresponding deflection pulse. To form horizontal synchronizing pulses according to the present invention, the clipped pulses are utilized to produce square pulses of the same duration as the clipped pulses. (The terms "square pulses" and "square wave pulses" as used herein connote pulses with sharp rise and fall times and which are flat on top, and they are not restricted to pulses having equal positive and negative portions.) Because of the slope to the rise and fall of the original pulse, these shorter square pulses occur intermediate the ends of the blanking pulses. These square pulses according to the present invention are added to the picture signal at some stage following the application of the blanking pulses, and because they are developed from the same pulses as the blanking pulses, they appear intermediate the ends of the blanking pulses and ride on the blanking pulses with front and back porches.

The vertical blanking and synchronizing pulses may be developed from square wave pulses developed in the vertical deflection circuit for driving the vertical deflection coil. The vertical deflection circuit necessarily includes a circuit for developing pulses at the rate required for vertical deflection of the electron beam in the television camera. Such pulses are utilized to energize the vertical deflection coils to cause the electron beam to deflect vertically at the required frequency.

As in the case of the horizontal retrace, it is desired to blank the television cameras during the vertical retrace of the electron beam. To this end, the just mentioned square wave pulses can be utilized directly for blanking the camera and for applying vertical blanking pulses to the picture signal.

To generate the vertical synchronizing signals, the square pulses may be differentiated to produce relatively sharp positive and negative pulses. According to the present invention, pulses of one polarity are clipped thereby producing pulses of a predetermined duration occurring at the beginning of the vertical blanking pulses. These pulses may then be used to derive square pulses of the same predetermined duration which may then be applied to the picture signal subsequent to the application of the vertical blanking pulses. As in the case of the horizontal blanking pulses, the vertical synchronizing pulses are caused to ride upon the vertical blanking pulses. By utilizing an appropriate time constant in the differentiating circuit, the vertical synchronizing pulses may be given appropriate duration to trigger the vertical deflection circuits of conventional television monitors and receivers. Such vertical synchronizing pulses are not in accordance with broadcast standards but are nevertheless compatible with conventional television monitors and receivers.

To further simplify the circuitry and components, various common circuits are used in developing and applying the horizontal and vertical blanking and synchronizing pulses.

It is therefore a primary object of the present invention to produce blanking and synchronizing pulses and to introduce them into a composite picture signal. It is a further object of the present invention to introduce such blanking and synchronizing pulses into the picture signal developed by a television camera in such manner as to produce a composite picture signal compatible with conventional television monitors and receivers. It is still another object of the present invention to derive vertical and horizontal blanking and synchronizing pulses from pulses produced in the vertical and horizontal deflection circuits used to drive the means for deflecting the electron beam in the television camera. Other objects and advantages of the present invention will become apparent from the consideration of the following description, particularly when taken in connection with the appended drawings, in which:

Figure 1:
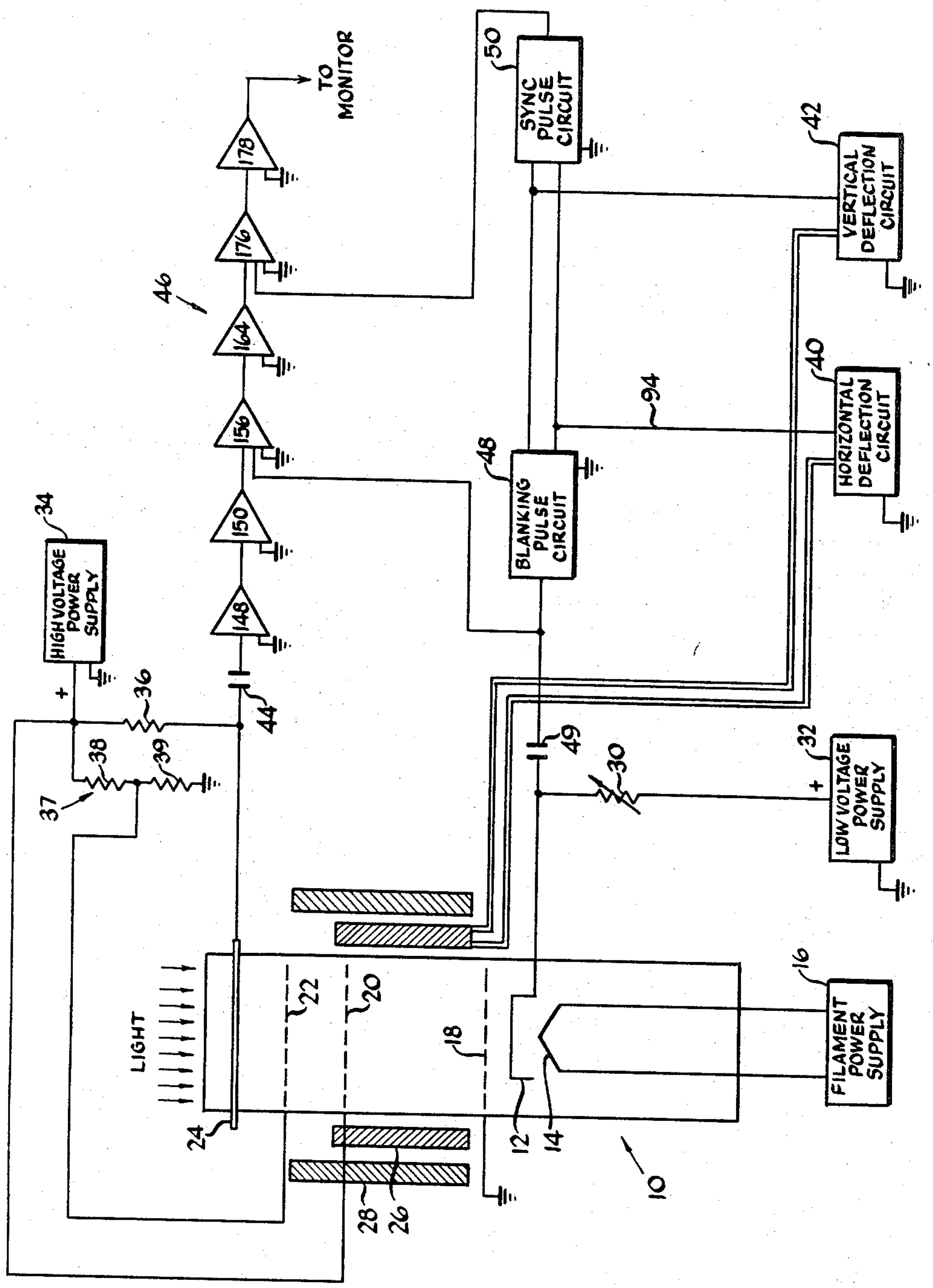
FIGURE 1 is a diagrammatic illustration of a preferred form of the present invention, showing functionally the various circuits utilized in developing and applying horizontal and vertical blanking and synchronizing pulses for a television camera.

FIGURE 1 illustrates a television camera circuit and in particular one including a vidicon tube 10. The vidicon tube includes a cathode 12 indirectly heated by a filament 14, the filament 14 being connected by a filament power supply 16 which supplies the power to heat the filament. The tube further contains a control electrode 18 and some sort of focusing electrode means illustrated generally as focusing electrodes 20 and 22. In some vidicon tubes, there may be additional focusing electrodes. Vidicon tubes generally include as focusing electrodes a plurality of cylindrical electrodes having suitable apertures for defining and focusing an electron beam. The tube further includes a signal electrode 24. Associated with the vidicon tube 10 are horizontal and vertical deflecting coils 26 and a focusing coil 28.

The control electrode 18 may be directly connected to ground. The cathode 12 may be connected to one end of a resistor 30, the other end of which is connected to the positive side of a low voltage regulated power supply 32. A high voltage regulated power supply 34 supplies positive potential through a load resistor 36 to the signal electrode 24. The focusing electrode 20 may be connected to the same terminal of the power supply 34. Further, this power supply 34 may supply positive potential to focusing electrode 22 through a voltage divider 37 comprising resistors 38 and 39.

The operation of the vidicon tube may be explained as follows: The heated filament 14 heats the cathode 12 causing it to emit electrons. The emitted electrons are attracted to the focusing electrodes 20 and 22 and to the signal electrode 24 because of the high positive potential applied to these electrodes. A more positive potential is applied to these electrodes than appears on the cathode 12. The magnitude of this electron current is limited, however, by the relative potential of the control electrode 18. The control electrode 18 is at a potential negative with respect to the potential of the cathode 18 and therefore inhibits the free flow of electrons. This cathode to control electrode bias is produced by the power supply 32 and by the cathode current flowing through the cathode resistor 30.

Electrons from the cathode that pass the control electrode 18 are defined into a narrow beam by the conjoint operation of the focusing electrodes 20 and 22 and the focusing coil 28. The focusing coil 28 is energized by means not shown to provide an axial magnetic field for magnetic focusing of the moving electrons. The focusing electrodes 20 and 22 provide electrostatic focusing which operates in conjunction with the magnetic focusing to produce a relatively narrow beam of electrons. The horizontal and vertical deflecting coils 26, respectively, supply additional magnetic fields which cause the electron beam to be deflected magnetically, causing the beam to scan the surface of the signal electrode 24 in accordance with the conventional television scanning scheme. The fields produced by the horizontal and vertical deflecting coils are controlled by respective signals from a horizontal deflection circuit 40 and a vertical deflection circuit 42.

The signal electrode 24 is photosensitive. The action of the light upon the signal electrode builds up a charge pattern upon the electrode. It is the discharge of this charge pattern by the electron beam that produces the flow of current through the load resistor 36 thereby developing an output signal at the signal electrode 24. This signal is applied through a coupling capacitor 44 to an amplifier 46 which may, as shown, comprise a number of stages of amplification. The output of this amplifier, with appropriate signal processing to include synchronizing pulses, becomes the composite picture signal which may be used to modulate a carrier signal for television transmission or may be used to operate a monitor or a video recorder.

The horizontal and vertical deflection circuits 40, 42 develop signals which may be used for developing appropriate blanking and synchronizing pulses. These signals are applied to a blanking pulse circuit 48 to develop horizontal and vertical blanking pulses. These blanking pulses are applied through a coupling capacitor 49 to the cathode 12 to stop electron emission during the time of the retracing of the electron beam after each horizontal and vertical scan. This is necessary to avoid destroying any of the charge on the signal electrode during retrace which would adversely affect the reproduced picture. At the same time the blanking pulses are applied to one of the stages of the amplifier 46 to form the blanking pulses in the composite picture signal.

The signals from the deflection circuits 40, 42 are also applied to a synchronizing pulse circuit 50 to develop horizontal and vertical synchronizing pulses. These pulses are applied to a succeeding stage of the amplifier 46 to form the horizontal and vertical synchronizing pulses in the composite picture signal.

Figure 2A:
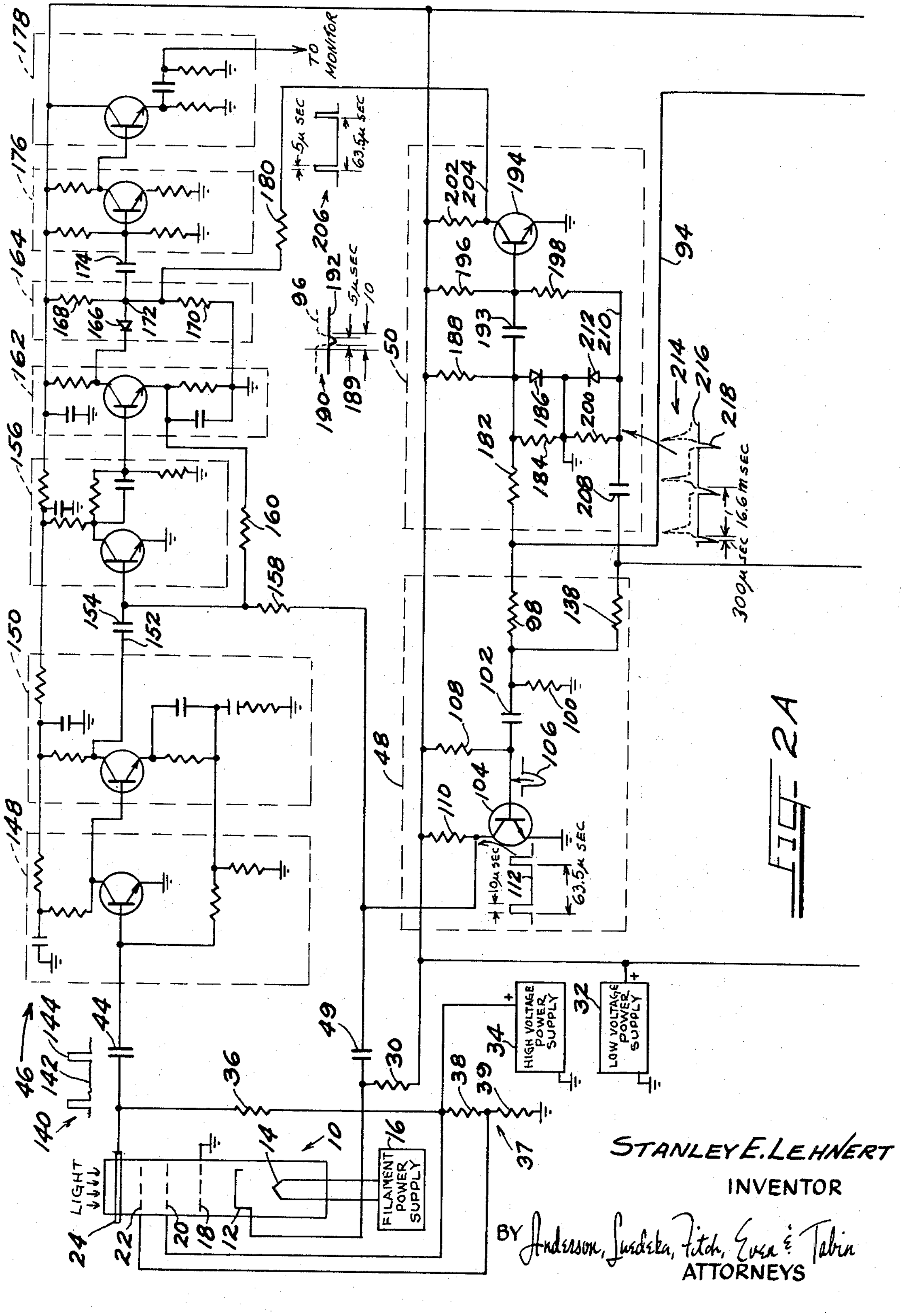
FIGURE 2 is a diagrammatic illustration of the embodiment of the invention as shown in FIGURE 1, showing in greater detail the circuits utilized, FIGURE 2 being on two sheets as FIGURE 2A and FIGURE 2B.
Figure 2B:
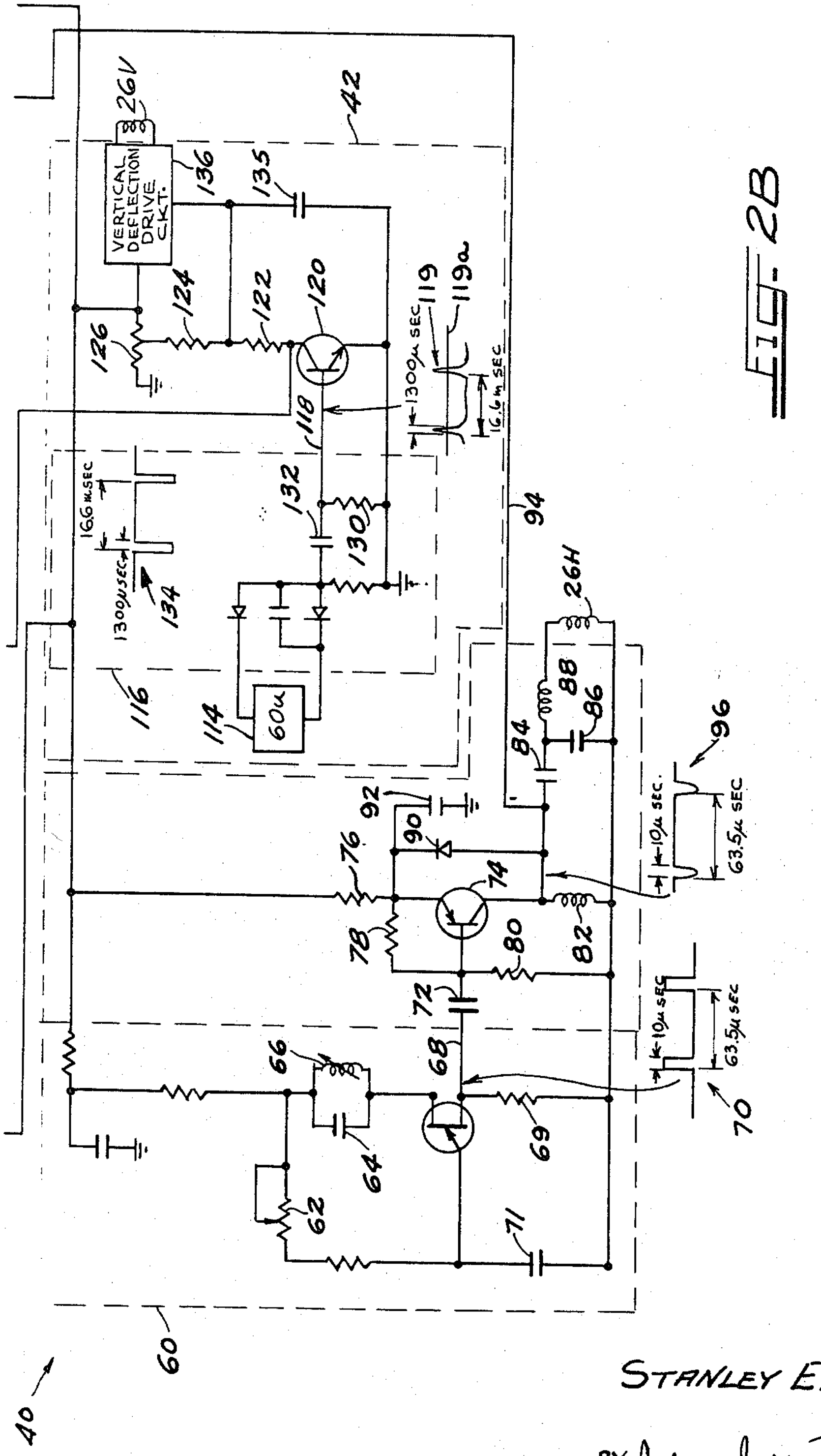

As shown in FIGURE 2, the horizontal deflecting circuit 40 includes a horizontal oscillator 60 for generating a signal at the horizontal scanning frequency for which the American standard is 15,750 cycles per second, the period thus being 63.5 microseconds. As shown, the oscillator may comprise a unijunction oscillator which may have a resonant frequency at the horizontal scanning frequency. The frequency of the oscillator may be set by the adjustment of a variable resistor 62. To improve the stability of the oscillator an auxiliary tank circuit comprising a capacitor 64 and a variable inductance 66 may be used, tuned to the desired frequency. The output of the horizontal oscillator 60 appears on an output lead 68 in the form of square shaped positive pulses as shown by wave form 70, occurring at a frequency of 15,750 pulses per second. The length of these pulses is determined by the time constant of the circuit comprising a resistor 69 and a capacitor 71. The pulse duration may be set, for example, at 10 microseconds.

These pulses are applied through a coupling capacitor 72 to the base of a transistor 74. The emitter of the transistor 74 is connected to B+ through a resistor 76. The B+ may, as shown, be the voltage supplied by the power supply 32 to economize on the number of power supplies required. This voltage may, for example, be plus 18 volts. At the same time bias is applied to the base of transistor 74 by means of a voltage divider comprising resistors 78 and 80. The collector of the transistor 74 is connected to one side of a coil 82, the other side of which is grounded. The transistor 74 is thus biased to be normally conducting; thus, current normally flows through the inductance 82.

Upon the application of a positive pulse 70, the transistor 74 is driven to cut-off, whereupon the field produced by the current through coil 82 begins to collapse. The coil 82 is connected by a coupling capacitor 84 to a capacitor 86. Across this capacitor 86 is also connected the horizontal deflector coil 26H in series with an additional coil 88. The circuit consisting of coils 82, 26H and 88 and capacitor 86 is tuned to ring at a particular frequency, preferably about 50 kilocycles. This would produce sine waves of 20 microseconds in length except for the fact that the tuned circuit is shunted by a diode 90 in series with a capacitor 92. The diode 90 is connected between the collector and the emitter of the transistor 74 and is polarized to conduct when the collector is positive with respect to the emitter. When the collector of transistor 74 goes positive, as would occur during the positive half cycles of the tuned circuit, the diode 90 conducts and thus cuts off the positive half cycles by grounding them through the capacitor 92, thus preventing continued ringing of the tuned circuit. The circuit thus produces a signal on the collector of the transistor 74 in the form of a single negative half sine wave upon application of each pulse 70.

These negative half sine waves appear on an output conductor 94 as illustrated by wave form 96. These pulses may be about 65 volts in magnitude. They are applied through the conductor 94 to the blanking pulse circuit 48. Voltages of such magnitude are unnecessary and are indeed undesired in the blanking pulse circuit 48. Nevertheless, pulses of such magnitude are produced by the horizontal deflecting circuits 40. The pulses are therefore cut down in size by a voltage divider comprising resistors 98 and 100. The smaller pulses are then applied through a coupling capacitor 102 to the base of a transistor 104. The wave form of the signal applied at the base of transistor 104 may be as illustrated by wave form 106, which will be identical in shape to the wave form 96, that is, it will comprise half sine wave pulses occurring at the rate of 15,750 cycles per second each having a duration of about 10 microseconds.

The transistor 104 acts as a clipper. Its emitter may be grounded and its base and collector may be connected to power supply 32 through resistors 108 and 110, respectively. The transistor 104 is normally conducting, thus placing the collector near ground potential. Upon application of the pulses of wave form 106 the transistor 104 becomes nonconducting almost immediately, whereupon the collector jumps to the reference potential supplied by the power supply 32, for example, plus 18 volts. The transistor 104 returns to its conducting state as soon as the applied pulse disappears. Thus, the signal appearing upon the collector of transistor 104 will comprise substantially square pulses as shown at 112.

The amplitude of the pulses 112 is the potential supplied by the power supply 32 (e.g., plus 18 volts) and the duration of each pulse is the duration of the pulses from the horizontal deflection pulses of wave forms 96 and 106 (e.g., about 10 microseconds). Further, these pulses would occur at the rate of the horizontal deflections (e.g., 15,750 cycles per second) and in synchronism with the applied pulses 106 and thus in synchronism with the horizontal retrace of the electron beam. These square pulses 112 are then applied through the coupling capacitor 49 to the cathode 12 of the camera tube 10 in order to cut off the electron beam for the duration of the blanking pulse.

The vertical deflection circuit 42 may be synchronized from power supply 114. The frequency of the output signal from the power supply 114 is preferably that required for the vertical deflection coil 26V, which according to American standards is 60 cycles per second. The power supply 114 may therefore be the power lines. The 60 cycle signal applied from the power supply 114 is shaped by a pulse shaper 116 which operates to produce on an output conductor 118 a 60 cycle signal including peaked positive pulses generally of the wave form 119. The shaped signal on conductor 118 is applied to the base of a transistor 120, the emitter of which is grounded, and its collector is connected to one end of a resistor 122. The other end of the resistor 122 may be connected by a resistor 124 to the tap on a voltage divider 126, the voltage divider 126 being connected between the power supply 32 and ground. The transistor 120 clamps the shaped input signal of wave form 119 and clips the signal at a clipping level **119*a*, and by virtue of the time constant of resistor 130 and capacitor 132, seeks an operating point such that collector current flows for only 1300 microseconds. The collector current of transistor 120 is therefore in the form of pulses, 1300 microseconds long, and at a 60 cycle recurrent rate. A square shaped pulse therefore appears at the collector of transistor 120 in the form illustrated by wave form 134**.

A capacitor 135 is connected between the junction of resistors 122 and 124 and ground. This produces a saw-tooth wave at the junction. This saw-tooth wave is applied to a vertical deflection drive circuit 136 which operates to derive an appropriate deflection drive signal. This drive signal is applied to the vertical deflection coil 26V to deflect the electron beam in a conventional and appropriate manner.

The square wave of signal wave form 134 is applied to a resistor 138 which operates in conjunction with the resistor 100 as a voltage divider stepping down the magnitude of the pulse to a level appropriate for driving the transistor 104. The stepped signal is then applied through the capacitor 102 in the same manner that the pulses of wave form 96 were applied. These pulses thus act in the same manner as the pulses of wave form 96 to develop on the collector of transistor 104 positive blanking pulses of the same square shape as the horizontal blanking pulses but longer, for example, 1300 microseconds in length rather than 10 microseconds. These 1300 microseconds impulses occur at the rate of 60 cycles per second. These pulses are applied through the coupling capacitor 49 to the cathode 12 of the camera tube 10 and cut off the electron beam for the duration of the vertical blanking pulses in the same manner that the electron beam is cut off by the horizontal blanking pulses.

By reason of the scanning of the electron beam across the signal electrode and the blanking of the electron beam during the retrace interval, a signal of the form shown by wave form 140 is developed on the signal electrode 24. The signal includes a picture portion 142 and a blanking portion 144. The blanking portions illustrated are the horizontal blanking portions, the vertical blanking portions being much longer. This signal is applied through the coupling capacitor 44 to an amplifier stage 148 of the amplifier 46 where the signal is amplified and applied to a further amplifier stage 150 of the amplifier 46. The amplifier stages 148 and 150 serve to amplify the signal on signal electrode 24 and produce an amplified signal of the same wave form on an output conductor 152. This amplified signal is applied through a coupling capacitor 154 to an amplifier stage 156 of the amplifier 46.

At the same time the blanking pulses produced on the collector of the transistor 104 are applied to the amplifier 156 by way of resistors 158 and 160, which form a voltage divider. Being produced by the same signals, these blanking pulses occur at the same time as the blanking portions of the wave form 140 and serve to provide a positive blanking signal input to the amplifier 156 to overcome the spurious signals usually present in the blanking portions 144, particularly after their amplification. The output of amplifier stage 156 is further amplified by an amplifier stage 162 of the amplifier 46 which further amplifies the signal.

The amplified signal is applied through a clipping circuit 164 comprising a diode 166 and a voltage divider formed by resistors 168 and 170. The output of the amplifier 162 is applied to the diode 166. The resistors 168 and 170 provide a potential on the diode 166 which serves to bias the diode to cut off the blanking portions to bring the blanking level down to the black level of the picture portion of the signal. The output of the clipping circuit appears on a conductor 172 and is applied through a coupling capacitor 174 to an amplifier stage 176 of the amplifier 46 which inverts the signal. The inverted signal is then applied to a line driving amplifier stage 178 of the amplifier 46. This stage may comprise an emitter follower.

At the same time synchronizing pulses are applied to the conductor 172 through a resistor 180 which, with the resistor 170, forms a voltage divider for stepping down the synchronizing pulses. These synchronizing pulses are also developed from the pulses present in the horizontal and vertical deflection circuits 40 and 42.

To develop the horizontal synchronizing pulses, the pulses of wave form 96 are applied over conductor 94 to a resistor 182 which, with a resistor 184, forms a voltage divider which steps down the magnitude of the signal. A diode 186 is connected in shunt with the resistor 184. The diode is biased by a voltage derived from a voltage divider comprising resistors 188 and 184 connected to the power supply 32. The diode 186 is biased and polarized to clip off the more positive portion of the signal of wave form 96 and leave only the negative going tips 189 as shown by wave form 190. The wave form 190 is shown with the wave form 96 superimposed to illustrate the effect of the clipping. The clipping level 192 is determined by the biasing potential supplied through the voltage divider 188 and 184.

In accordance with the present invention, the clipping level is set at such level as to provide clipped pulses of a predetermined duration. More particularly, the clipping level may be set to produce clipped pulses of 5 microseconds duration. Where the pulses of wave form 96 are half sine waves, the clipping produces pulses 189 that are the tips of half sine waves, with the tips occuring centrally of the original pulses of wave form 96. Thus, if the original pulses of wave form 96 are 10 microseconds long and the clipped portions 189 are 5 microseconds long, the pulses of wave form 96 will extend 2½ microseconds before and after the pulses 189.

The clipped pulses 189 are applied through a coupling capacitor 193 to the base of a transistor 194. Bias is applied to this base by resistors 196, 198 and 200 connected as a voltage divider between power supply 32 and ground. An output resistor 202 is connected between the collector of transistor 194 and power supply 32, and the emitter of transistor 194 is grounded. Transistor 194 is normally conducting and is turned off by the negative pulses 189, thereby developing square wave pulses on a conductor 204. These pulses are square shaped positive pulses as illustrated by wave form 206. These pulses are 5 microseconds long occurring at a rate of 60 cycles per second in the center of the horizontal blanking pulses.

Similarly, vertical synchronizing pulses are derived from the signals of wave form 134, developed in the vertical deflection circuit. These signals are applied to the synchronizing pulse circuit 50 where they are applied to a differentiating circuit which comprises a capacitor 208 and the resistor 200. The output of this differentiating circuit appears on a conductor 210. A diode 212 is connected between conductor 210 and ground. This diode is biased by the voltage divider comprising resistors 196, 198 and 200 to clip the differentiated pulses appearing on conductor 210.

Absent the effect of the diode, the pulses developed on conductor 210 would be as illustrated by the dotted lines in wave form 214. Because of the polarity and biasing of the diode 212, the signal is clipped at clipping level 216 to leave only the negative tips 218 of the differentiated signal. By appropriate setting of the time constant of the differentiating circuit and appropriate setting of the clipping level established by the voltage divider 196, 198 and 200, the duration of the pulses 218 can be made any desired length, for example, about 300 microseconds.

The clipped pulses of the desired duration are of negative polarity and are applied through the resistor 198 to the base of the transistor 194, thus cutting off the transistor 194 in the same mannr as it was cut off by the clipped pulses 189, thus also developing positive square pulses on conductor 204. The horizontal and vertical synchronizing pulses thus developed on conductor 204 are, as stated above, applied to a voltage divider comprising resistors 180 and 170, whence they are applied through the coupling capacitor 174 to the amplifier stage 176.

Figure 3:
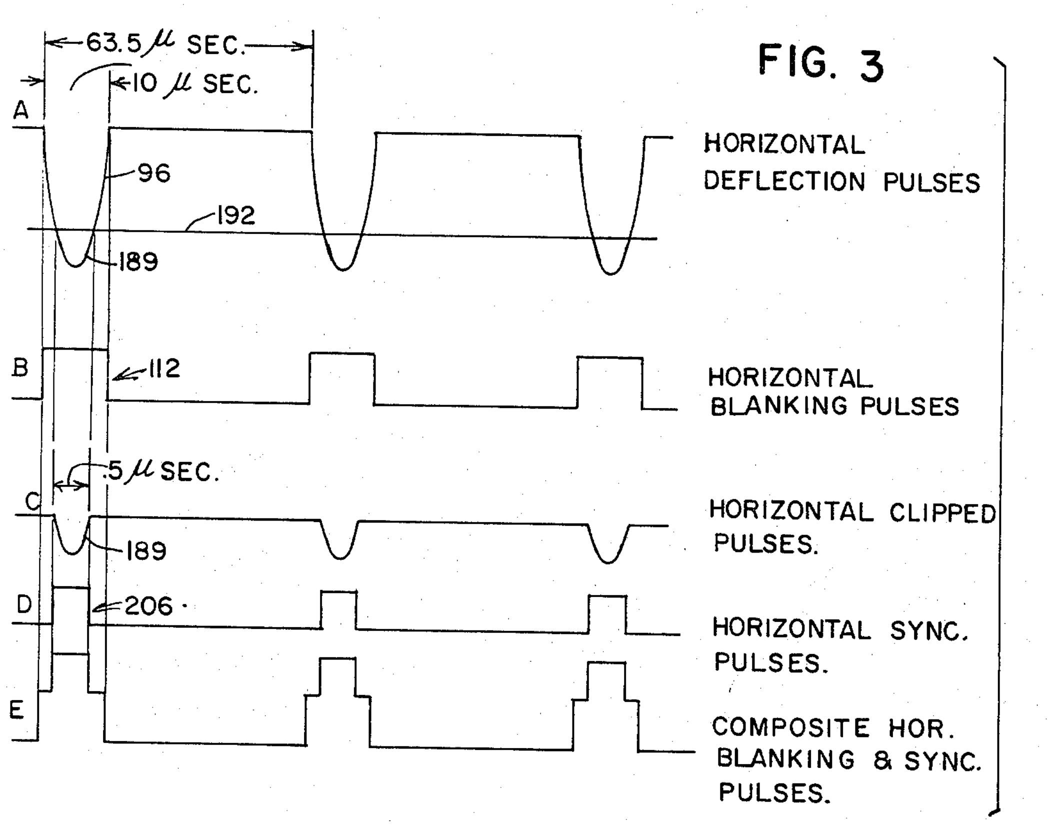
FIGURE 3 illustrates the wave forms of various signals produced in the course of developing horizontal blanking and synchronizing pulses according to the present embodiment of the invention.

The development and application of the horizontal blanking and synchronizing pulses by the apparatus illustrated in FIGURE 2 may be explained briefly by reference to FIGURE 3. In FIGURE 3A there is illustrated the wave form 96 as developed by the horizontal deflection circuit 40. The pulses of wave form 96 have a predetermined shape and duration. It is important that this wave form have a finite rise time and finite fall time. In the particular circuit described the wave form comprises half sine waves. If the horizontal deflection pulses of some other horizontal deflection circuit are of a square wave nature, they may be converted into a wave form having finite rise and fall times by appropriate circuitry, such as integrating and clipping circuits. These pulses will then have a predetermined shape and duration. In the particular circuit described the half sine waves are made 10 microseconds in duration occurring every 63.5 microseconds. The base of the pulses of wave form 96 are therefore each 10 microseconds long. This 10 microsecond base is used to develop the horizontal blanking pulse.

In the particular circuit shown in FIGURE 2, the transistor 104 operates as a clipper stage and an inverter to produce positive blanking pulses as illustrated in FIGURE 3B, each pulse being 10 microseconds long and occurring every 63.5 microseconds. At the same time the tips 189 of the pulses of the wave form shown in FIGURE 3A, are clipped at a clipping level 192 to produce the pulses shown in FIGURE 3C, each of 5 microseconds duration and occurring centrally of the respective pulses of FIGURE 3A.

The bases of the pulses 189 shown in FIGURE 3C may then be used to develop the horizontal synchronizing pulses. In the particular circuit shown, the transistor 194 clips and inverts the pulses 189 to produce horizontal synchronizing pulses shown in FIGURE 3D.

The signals are combined in the amplifier 46 to produce the composite horizontal blanking and synchronizing pulses as illustrated in FIGURE 3E, where the synchronizing pulses ride on the blanking pulses centrally thereof leaving front and back porches.

Figure 4:
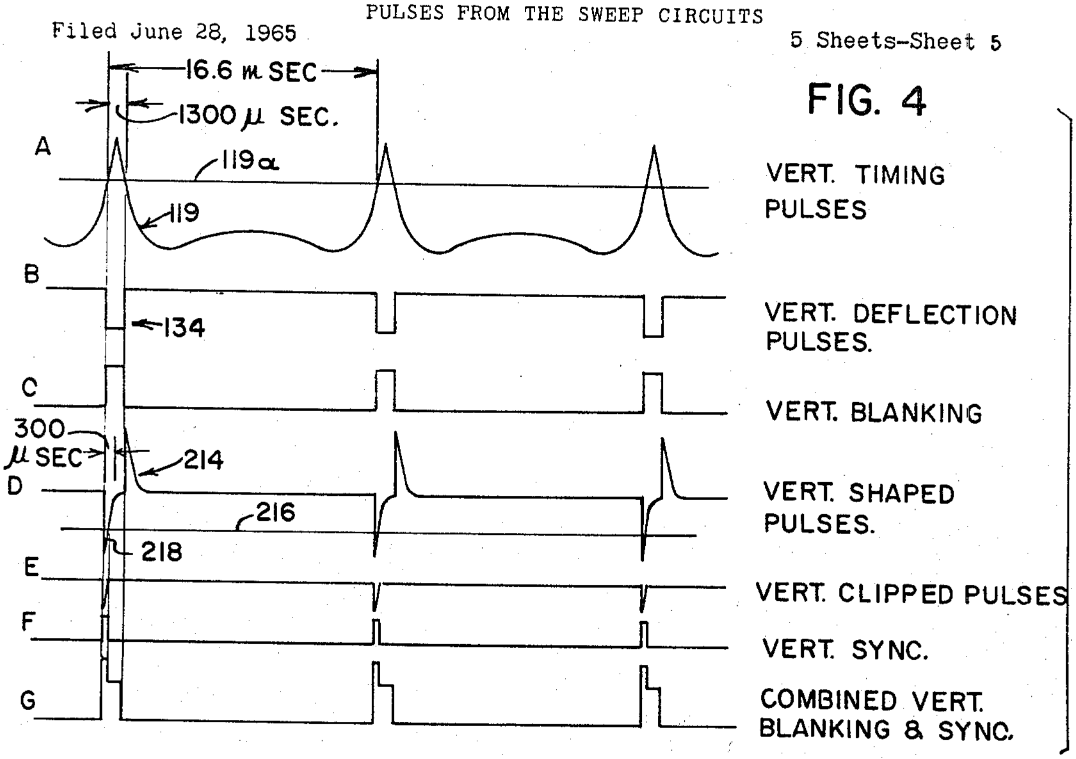
FIGURE 4 illustrates the wave forms of various signals produced in the course of developing the vertical blanking and synchronizing pulses according to the present embodiment of the invention.

The operation of the circuit of FIGURE 2 to develop and apply the vertical blanking and synchronizing pulses can be briefly explained by reference to FIGURE 4. In FIGURE 4 there is illustrated a typical wave form developed in a vertical deflection circuit, in particular the wave form 119 having positive portions 1300 microseconds long occurring every 16.6 milliseconds. From these pulses the vertical deflection signals are developed, in the course of which square pulses are developed, as shown in FIGURE 4B. FIGURE 4B shows the pulses of wave form 134. Like the horizontal deflection pulses of wave form 96 these vertical deflection pulses as shown in FIGURE 4B may be used to develop the vertical blanking pulses, in particular being inverted and clipped by the transistor 104 to produce the positive square wave pulses illustrated in FIGURE 4C, which may be used for vertical blanking.

At the same time the pulses of FIGURE 4B are shaped as by being differentiated by the differentiating circuit 200, 208 to produce a narrower wave form, as shown in FIGURE 4D. This is the wave form 214 that would be developed on conductor 210 in the absence of clipping. However, the wave form is clipped at the clipping level 216. This clips off all of the signal above the clipping level leaving only the tips 218. Thus, the signal as shown in FIGURE 4E is the signal actually developed upon the conductor 210. This signal is applied to the transistor 194 to develop positive square pulses as shown in FIGURE 4F. The vertical blanking and synchronizing signals are combined in the amplifier 46 to produce a combined vertical and blanking synchronizing signal as shown in FIGURE 4G. The vertical synchronizing pulses ride on the vertical blanking pulses, beginning at the beginning of the blanking pulses.

Figure 5:
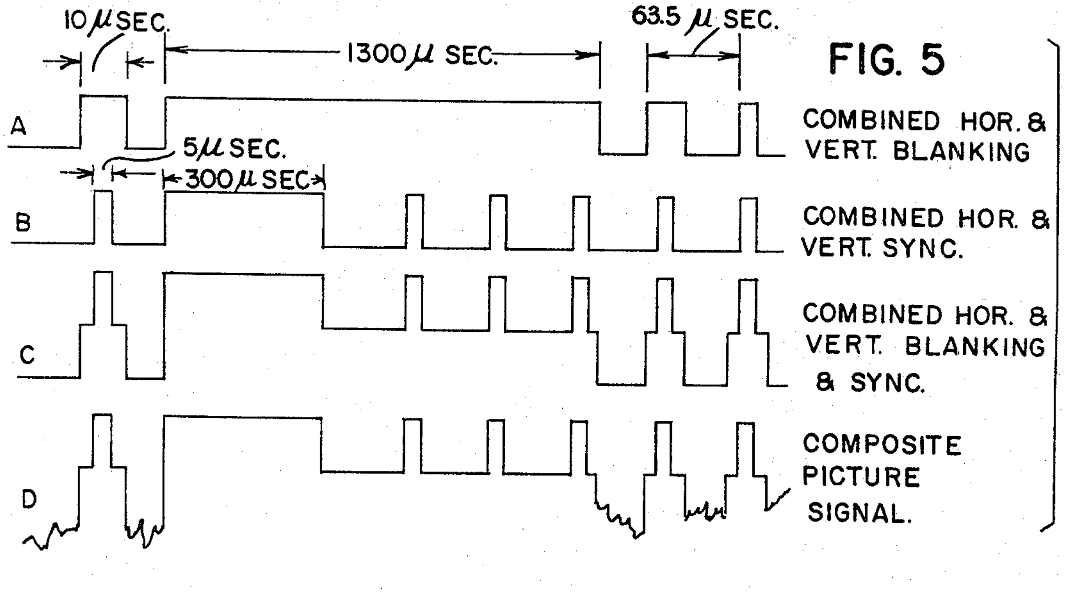
FIGURE 5 illustrates generally the composite picture signals produced by the combination of the horizontal and vertical blanking and synchronizing signals with the picture signal.

In FIGURE 5 is illustrated the manner in which the horizontal and vertical blanking and synchronizing pulses are all combined. It should be noted that the time scales are not accurate and that therefore the proper number of horizontal pulses is not shown during the vertical blanking pulse. In FIGURE 5A there is illustrated the combined horizontal and vertical blanking pulses as applied to the cathode 12 of the camera tube 10 and as applied to the input of amplifier stage 156. In FIGURE 5B there is illustrated the combined horizontal and vertical synchronizing pulses as applied to the amplifier stage 176. In FIGURE 5C there is illustrated the combined vertical and horizontal blanking and synchronizing pulses as produced at the input of the amplifier stage 176. Although previously left unmentioned to simplify the description, the picture signal produced at the signal electrode 24 is also present as part of the composite picture signal at the input of amplifier stage 176. At this point the composite picture signal appears as indicated in FIGURE 5D.

It is thus apparent that the circuit of FIGURE 2 develops horizontal and vertical blanking and synchronizing pulses from signals already present in the horizontal and vertical deflection circuits. In the case of the horizontal blanking and synchronizing pulses, the circuit operates on pulses having finite rise and fall times as produced in the horizontal deflection circuit for producing signals to drive the horizontal deflection coil. These signals necessarily have the frequency of the horizontal scanning. They are utilized to develop horizontal blanking pulses of a predetermined length while at the same time they are clipped to produce shorter pulses occurring centrally of the blanking pulses. The clipped pulses are used to develop horizontal synchronizing pulses of a predetermined shorter length occurring during the middle part of the horizontal blanking pulses. These pulses are combined to form combined horizontal blanking and synchronizing pulses having front and back porches. Further, the combined pulses are compatible with conventional television monitors and receivers.

At the same time a square wave pulse, produced in the vertical deflection circuit for developing a signal to drive the vertical deflection coil, is used to develop a vertical blanking pulse of predetermined length. Simultaneously the pulse is differentiated and clipped, and the clipped pulses are used to develop vertical synchronizing pulses of shorter duration beginning at the beginning of the vertical blanking pulses. The vertical synchronizing pulses, although not standard, are nevertheless effective to trigger the vertical synchronization of conventional television monitors and receivers. Thus the composite picture signal developed pursuant to this invention is compatible with conventional monitors and television receivers designed to receive and reproduce broadcast signals.

Although a preferred embodiment has been described in some detail, various modifications may be made therein, within the scope of the present invention as set forth in the claims.

What is claimed is:

1. In a closed-circuit video system including an imaging device for converting a light image into electrical picture signals wherein the light image is dissected for sequential conversion by operation of horizontal and vertical scanning means, a horizontal deflection circuit for producing horizontal deflecting pulses of first predetermined wave shape and duration at the horizontal scanning frequency to drive the horizontal deflection means, and a vertical deflection circuit for producing vertical deflection pulses of a second predetermined wave shape and duration at the vertical scanning frequency to drive the vertical scanning means: apparatus for producing horizontal and vertical blanking and synchronizing pulses for developing a composite picture signal, said apparatus comprising means responsive to said horizontal deflection pulses for producing square wave horizontal blanking pulses of duration substantially equal to the duration of said horizontal deflection pulses, means coupled to said horizontal deflection circuit for clipping said horizontal deflection pulses to produce first clipped pulses of duration shorter than said horizontal deflection pulses and inset in time from both ends of respective horizontal deflection pulses, means responsive to said first clipped pulses for producing square wave horizontal synchronizing pulses of duration substantially equal to the duration of said first clipped pulses and occurring in time inset from both ends of respective horizontal blanking pulses, means responsive to said vertical deflection pulses for producing square wave vertical blanking pulses of duration equal to the duration of said vertical deflection pulses, differentiating means coupled to said vertical deflection circuit for differentiating said vertical deflection pulses to produce differentiated pulses narrower than said vertical deflection pulses, means coupled to said differentiating means to produce second clipped pulses of duration shorter than said vertical deflection pulses and terminating prior to the termination of respective vertical deflection pulses, means responsive to said second clipped pulses for producing square wave vertical synchronizing pulses of duration substantially equal to the duration of said second clipped pulses and terminating prior to the termination of respective vertical blanking pulses, and means for mixing said electrical picture signals, said horizontal blanking pulses, said vertical blanking pulses, said horizontal synchronizing pulses and said vertical synchronizing pulses to produce a composite picture signal.

2. In a closed-circuit video system including an imaging device for converting a light image into electrical picture signals wherein the light image is dissected for sequential conversion by operation of horizontal and vertical scanning means, a horizontal deflection circuit for producing horizontal deflecting pulses at the horizontal scanning frequency to drive the horizontal deflection means, and a vertical deflection circuit for producing vertical deflection pulses at the vertical scanning frequency to drive the vertical scanning means: apparatus for producing horizontal and vertical blanking and synchronizing pulses for developing a composite picture signal, said apparatus comprising first pulse shaping means for shaping said horizontal deflection pulses for forming respective first shaped pulses each having a first predetermined duration and finite rise and fall times, means responsive to said first shaped pulse for producing square wave horizontal blanking pulses of duration substantially equal to the duration of said first shaped pulses, means for clipping said first shaped pulses to produce first clipped pulses of a second predetermined duration shorter than said first shaped pulses and inset in time from both ends of said first shaped pulses, means responsive to said first clipped pulses for producing square wave horizontal synchronizing pulses of duration substantially equal to the duration of said first clipped pulses and occurring in time inset from both ends of said horizontal blanking pulses, means responsive to said vertical deflection pulses for producing square wave vertical blanking pulses of a third predetermined duration, second pulse shaping means coupled to said vertical deflection circuit for shaping said vertical deflection pulses to produce second shaped pulses having a fast rise time and a slower fall time, means responsive to said second shaped pulses for producing square wave vertical synchronizing pulses of a fourth predetermined duration beginning substantially at the beginning of respective vertical blanking pulses and terminating prior to the termination of respective vertical blanking pulses, and means for mixing said electrical picture signals, said horizontal blanking pulses, said vertical blanking pulses, said horizontal synchronizing pulses and said vertical synchronizing pulses to produce a composite picture signal.

3. In a closed-circuit video system including an imaging device for converting a light image into electrical picture signals wherein the light image is dissected for sequential conversion by operation of horizontal and vertical scanning means, a horizontal deflection circuit for producing horizontal deflecting pulses at the horizontal scanning frequency to drive the horizontal deflection means, and a vertical deflection circuit for producing vertical deflection pulses at the vertical scanning frequency to drive the vertical scanning means: apparatus for producing horizontal and vertical blanking and synchronizing pulses for developing a composite picture signal, said apparatus comprising means responsive to said horizontal deflection pulses for producing square wave horizontal blanking pulses of a first predetermined duration, means coupled to said horizontal deflection circuit for producing square wave horizontal synchronizing pulses of second predetermined duration less than said first predetermined duration and occurring in time inset from both ends of respective horizontal blanking pulses, means responsive to said vertical deflection pulses for producing square wave vertical blanking pulses of a third predetermined duration, pulse shaping means coupled to said vertical deflection circuit for shaping said vertical deflection pulses to produce shaped pulses having a fast rise time and a slower fall time, means responsive to said shaped pulses for producing square wave vertical synchronizing pulses of a fourth predetermined duration beginning substantially at the beginning of respective vertical blanking pulses and terminating prior to the termination of respective vertical blanking pulses, and means for mixing said electrical picture signals, said horizontal blanking pulses, said vertical blanking pulses, said horizontal synchronizing pulses and said vertical synchronizing pulses to produce a composite picture signal.

4. In a closed-circuit video system including an imaging device for converting a light image into electrical picture signals wherein the light image is dissected for sequential conversion by operation of horizontal and vertical scanning means, a horizontal deflection circuit for producing horizontal deflecting pulses at the horizontal scanning frequency to drive the horizontal deflection means, and a vertical deflection circuit for producing vertical deflection pulses at the vertical scanning frequency to drive the vertical scanning means: apparatus for producing horizontal and vertical blanking and synchronizing pulses for developing a composite picture signal, said apparatus comprising means responsive to said horizontal deflection pulses for producing square wave horizontal blanking pulses of a first predetermined duration, means coupled to said horizontal deflection circuit for producing square wave horizontal synchronizing pulses of second predetermined duration less than said first predetermined duration and occurring in time inset from both ends of respective horizontal blanking pulses, means responsive to said vertical deflection pulses for producing square wave vertical blanking pulses of a third predetermined duration equal to the duration of said vertical deflection pulses, pulse shaping means coupled to said vertical deflection circuit for shaping said vertical deflection pulses to produce shaped pulses narrower than said vertical deflection pulses, means responsive to said shaped pulses for producing square wave vertical synchronizing pulses of a fourth predetermined duration beginning substantially at the beginning of respective vertical blanking pulses and terminating prior to the termination of respective vertical blanking pulses, and means for mixing said electrical picture signals, said horizontal blanking pulses, said vertical blanking pulses, said horizontal synchonizing pulses and said vertical synchronizing pulses to produce a composite picture signal.

5. In a closed-circuit video system including an imaging device for converting a light image into electrical picture signals wherein the light image is dissected for sequential conversion by operation of horizontal and vertical scanning means, a horizontal deflection circuit for producing horizontal deflecting pulses at the horizontal scanning frequency to drive the horizontal deflection means, and a vertical deflection circuit for producing vertical deflection pulses at the vertical scanning frequency to drive the vertical scanning means: apparatus for producing horizontal and vertical blanking and synchronizing pulses for developing a composite picture signal, said apparatus comprising means responsive to said horizontal deflection pulses for producing square wave horizontal blanking pulses of a first predetermined duration, means coupled to said horizontal deflection circuit for producing square wave horizontal synchronizing pulses of second predetermined duration less than said first predetermined duration and occurring in time inset from both ends of respective horizontal blanking pulses, pulse shaping means responsive to said vertical deflection pulses for producing square wave vertical blanking pulses of third predetermined duration, differentiating means for differentiating said square wave vertical blanking pulses to produce differentiated pulses having a fast rise time and a slower fall time, means coupled to said differential means for clipping said differentiated pulses to produce clipped pulses of fourth predetermined duration shorter than said vertical blanking pulses and terminating prior to the termination of respective vertical blanking pulses, means responsive to said clipped pulses for producing square wave vertical synchronizing pulses of duration substantially equal to the duration of said clipped pulses and terminating prior to the termination of said vertical blanking pulses, and means for mixing said electrical picture signals, said horizontal blanking pulses, said vertical blanking pulses, said horizontal synchronizing pulses and said vertical synchronizing pulses to produce a composite picture signal.

6. In a closed-circuit video system including an imaging device for converting a light image into electrical picture signals wherein the light image is dissected for sequential conversion by operation of horizontal and vertical scanning means, a horizontal deflection circuit for producing horizontal deflecting pulses of first predetermined wave shape and duration at the horizontal scanning frequency to drive the horizontal deflection means, and a vertical deflection circuit for producing vertical deflection pulses of a second predetermined wave shape and duration at the vertical scanning frequency to drive the vertical scanning means: apparatus for producing horizontal and vertical blanking and synchronizing pulses for developing a composite picture signal, said apparatus comprising means responsive to said horizontal deflection pulses for producing square wave horizontal blanking pulses of duration substantially equal to the duration of said horizontal deflection pulses, means coupled to said horizontal deflection circuit for clipping said horizontal deflection pulses to produce first clipped pulses of duration shorter than said horizontal deflection pulses and inset in time from both ends of respective horizontal deflection pulses, means responsive to said first clipped pulses for producing square wave horizontal synchronizing pulses of duration substantially equal to the duration of said first clipped pulses and occurring in time inset from both ends of respective horizontal blanking pulses, means responsive to said vertical deflection pulses for producing square wave vertical blanking pulses of duration equal to the duration of said vertical deflection pulses, differentiating means coupled to said vertical deflection circuit for differentiating said vertical deflection pulse to produce differentiated pulses narrower than said vertical deflection pulses, means coupled to said differentiating means to produce second clipped pulses of duration shorter than said vertical deflection pulses and terminating prior to the termination of respective vertical deflection pulses, means responsive to said second clipped pulses for producing square wave vertical synchronizing pulses of duration substantially equal to the duration of said second clipped pulses and terminating prior to the termination of respective vertical blanking pulses, means responsive to said horizontal and vertical blanking pulses for blanking said imaging device for the duration of each of said horizontal and vertical blanking pulses, and means for mixing said electrical picture signals, said horizontal blanking pulses, said vertical blanking pulses, said horizontal synchronizing pulses and said vertical synchronizing pulses to produce a composite picture signal.

7. In a closed-circuit video system including an imaging device for converting a light image into electrical picture signals wherein the light image is dissected for sequential conversion by operation of horizontal and vertical scanning means, a horizontal deflection circuit for producing half sine wave horizontal deflecting pulses of first predetermined duration at the horizontal scanning frequency to drive the horizontal deflection means, and a vertical deflection circuit for producing square wave vertical deflection pulses of a second predetermined duration at the vertical scanning frequency to drive the vertical scanning means; apparatus for producing horizontal and vertical blanking and synchronizing pulses for developing a composite picture signal, said apparatus comprising means responsive to said horizontal deflection pulses for producing square wave horizontal blanking pulses of duration substantially equal to the duration of said horizontal deflection pulses, means coupled to said horizontal deflection circuit for clipping said horizontal deflection pulses to produce first clipped pulses of duration shorter than said horizontal deflection pulses and inset in time from both ends of respective horizontal deflection pulses, means responsive to said first clipped pulses for producing square wave horizontal synchronizing pulses of duration substantially equal to the duration of said first clipped pulses and occurring in time inset from both ends of respective horizontal blanking pulses, means responsive to said vertical deflection pulses for producing square wave vertical blanking pulses of duration equal to the duration of said vertical deflection pulses, differentiating means coupled to said vertical deflection circuit for differentiating said vertical deflection pulses to produce differentiated pulses narrower than said vertical deflection pulses, means coupled to said differentiating means for clipping said differentiated pulses to produce second clipped pulses of duration shorter than said vertical deflection pulses and terminating prior to the termination of respective vertical deflection pulses, means responsive to said second clipped pulses for producing square wave vertical synchronizing pulses of duration substantially equal to the duration of said second clipped pulses and terminating prior to the termination of respective vertical blanking pulses, and means for mixing said electrical picture signals, said horizontal blanking pulses, said vertical blanking pulses, said horizontal synchronizing pulses and said vertical synchronizing pulses to produce a composite picture signal.

8. In a closed-circuit video system including an imaging device for converting a light image into electrical picture signals wherein the light image is dissected for sequential conversion by operation of horizontal and vertical scanning means, a horizontal deflection circuit for producing horizontal deflecting pulses at the horizontal scanning frequency to drive the horizontal deflection means, and a vertical deflection circuit for producing vertical deflection pulses at the vertical scanning frequency to drive the vertical scanning means: apparatus for producing horizontal and vertical blanking and synchronizing pulses for developing a composite picture signal, said apparatus comprising first pulse shaping means for shaping said horizontal deflection pulses for forming respective first shaped pulses each having a first predetermined duration and finite rise and fall times, means responsive to said first shaped pulse for producing a square wave horizontal blanking pulses of duration substantially equal to the duration of said first shaped pulses, means for clipping said first shaped pulses to produce first clipped pulses of duration shorter than said first shaped pulses and inset in time from both ends of said first shaped pulses, means responsive to said first clipped pulses for producing square wave horizontal synchronizing pulses of duration substantially equal to the duration of said first clipped pulses and occurring in time inset from both ends of said horizontal blanking pulses, second pulse shaping means responsive to said vertical deflection pulses for producing square wave vertical blanking pulses of second predetermined duration, differentiating means for differentiating said square wave vertical blanking pulses to produce differentiated pulses narrower than said vertical blanking pulses, means coupled to said differentiating means for clipping said differentiated pulses to produce second clipped pulses of duration shorter than said vertical blanking pulses and terminating prior to the termination of respective vertical blanking pulses, means responsive to said second clipped pulses for producing square wave vertical synchronizing pulses of duration substantially equal to the duration of said second clipped pulses and terminating prior to the termination of said vertical blanking pulses, and means for mixing said electrical picture signals, said horizontal blanking pulses, said vertical blanking pulses, said horizontal synchronizing pulses and said vertical synchronizing pulses to produce a composite picture signal.

References Cited

UNITED STATES PATENTS 2,976,256 3/1961 Fathauer ------------ 178—6.8

ROBERT L. GRIFFIN, *Primary Examiner.*

R. L. RICHARDSON, *Assistant Examiner.*